Dec. 15, 1936.  F. H. HAGNER  2,064,062
NAVIGATING INSTRUMENT
Filed Jan. 30, 1935  5 Sheets-Sheet 1

Inventor
FREDERICK HAYES HAGNER

Dec. 15, 1936.   F. H. HAGNER   2,064,062
NAVIGATING INSTRUMENT
Filed Jan. 30, 1935   5 Sheets-Sheet 2

INVENTOR
FREDERICK HAYES HAGNER
Attorney

Dec. 15, 1936.　　　　F. H. HAGNER　　　　2,064,062
NAVIGATING INSTRUMENT
Filed Jan. 30, 1935　　　5 Sheets-Sheet 4

INVENTOR
FREDERICK HAYES HAGNER

Patented Dec. 15, 1936

2,064,062

UNITED STATES PATENT OFFICE 2,064,062

NAVIGATING INSTRUMENT

Frederick Hayes Hagner, San Antonio, Tex., assignor to Position Finder Corporation, San Antonio, Tex., a corporation of Texas Application January 30, 1935, Serial No. 4,196

17 Claims. (Cl. 33—1)

This invention relates to a navigating instrument and constitutes an improvement upon my application relating to a Position finder, filed June 23, 1933, Serial Number 677,317; and also constitutes a continuation in part of my application relating to a Solartorium, filed April 18, 1934, Serial Numbber 721,197.

One of the principal objects of this invention is the production of a mechanical device which gives in degrees and fractions thereof, the exact measurements of latitude and hour angle (from which longitude is ascertained), and the position of the imaginary poles with reference to the position of the observer.

Another object of this invention is the production of a simple and efficient mechanical means for facilitating the operation of the various measuring and recording elements of the device, whereby proper settings and adjustments may be made to give the relative position of the observer and the observed bodies.

Other objects and advantages of the present invention will appear throughout the following specification and claims.

Figures 3, 8:
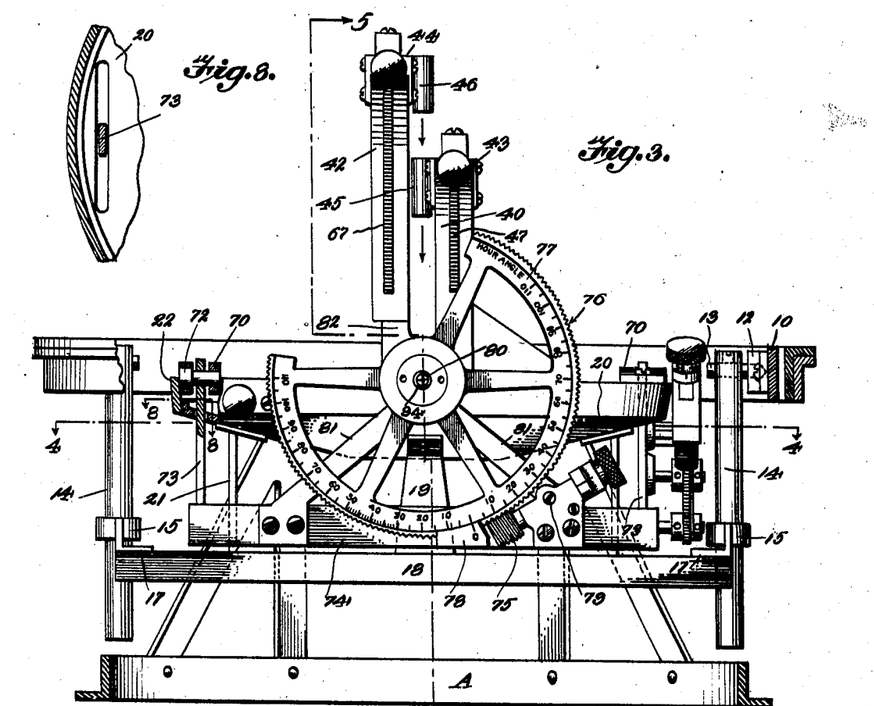
Figure 3 is a side elevation taken at right angles to Figure 1, certain parts being shown in section.
Figure 8 is a section taken on line 8—8 of Figure 3.

By referring to the drawings, it will be seen that A designates a gimbal of the conventional type which is provided with a suspension ring 10 pivoted as at 11 to the frame of the gimbal to permit swinging of the ring in one direction. The suspension ring 10 carries journals 12 arranged at right angles to the pivots 11 and formed on the inner face of the ring 10, as shown in Figure 3. These journals receive journal pins 13 which pins are carried by the suspension rods 14 of the body of the navigating instrument. The graduations on the rim of the gimbal A are used for setting the compass course, or correcting the compass reading for declamation and variation.

Figure 4:
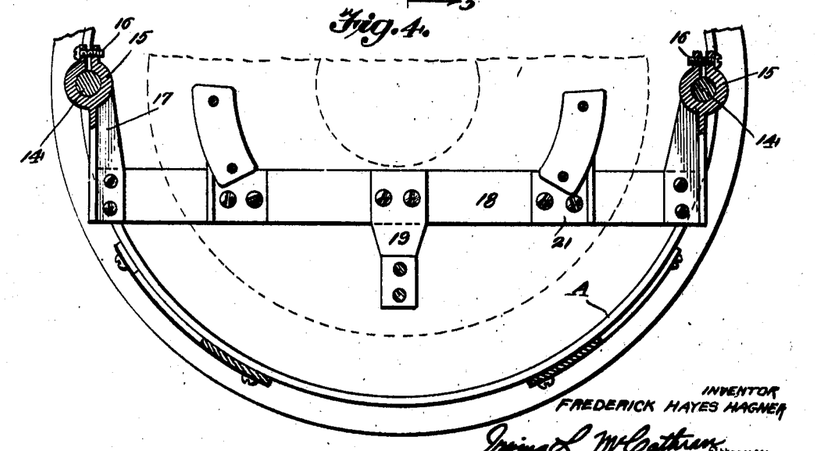
Figure 4 is a section taken on line 4—4 of Figure 3.
Figure 5:
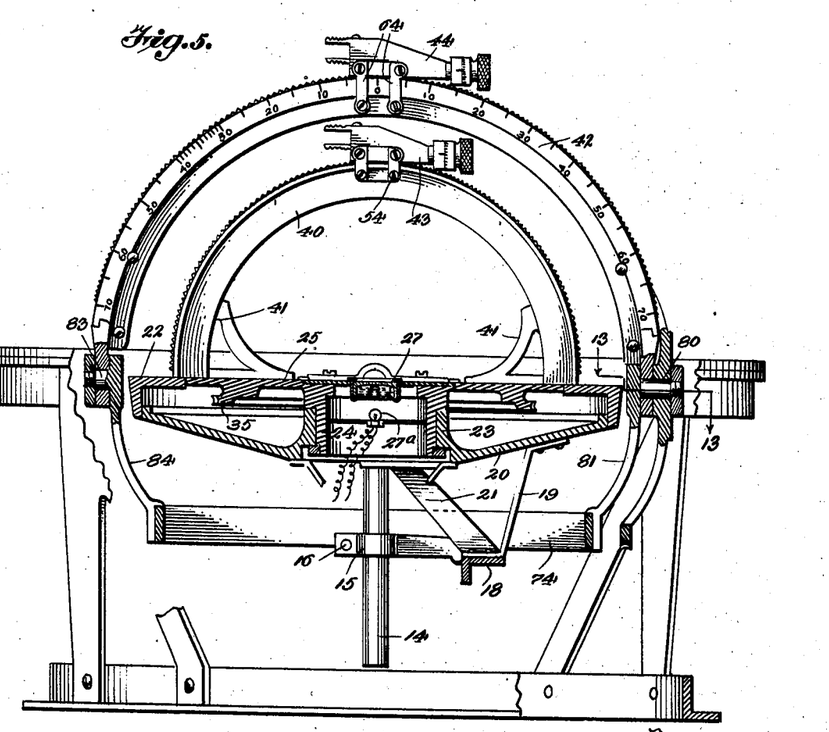
Figure 5 is a section taken on line 5—5 of Figure 3.
Figures 6, 13:
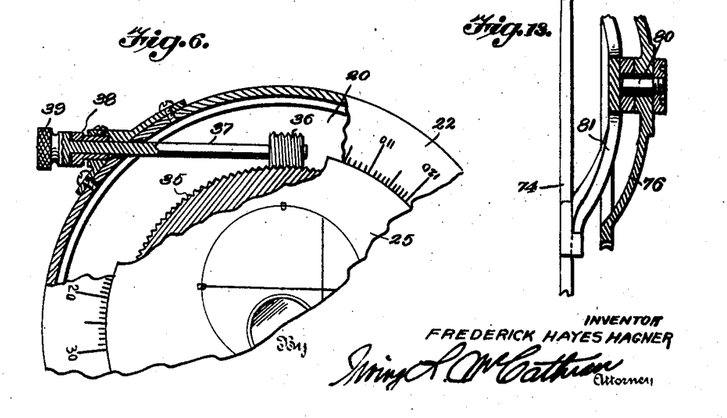
Figure 6 is a horizontal sectional view taken through the ring and disc which support the azimuth plate or disc showing the means for adjusting the azimuth disc or plate.
Figure 13 is a section taken on line 13—13 of Figure 5.

The suspension rods 14 constitute hangers upon which hangers are adjustably mounted platform supporting arms 15, the arms 15 being locked in an adjusted position through the medium of the clamping screws 16. The arms 15 extend substantially at right angles to the rods 14, as shown in Figure 4, and these arms 15 are provided with inwardly extending web portions 17, to which web portions 17 is secured a platform 18. This platform 18 may be of an angle iron structure, as is shown in Figure 5.

The platform 18 is provided with an upwardly extending inclined bracing arm 19, which arm 19 braces and supports a disc 20. Additional upwardly extending braces 21 also support the disc 20—see Figure 3. This disc 20 carries a graduated ring 22 which extends around the edge of the disc 20 and overhangs the upper face, as shown in Figure 5, and the ring 22 consists preferably of an angle iron structure in cross-section and is secured in any suitable or desired manner to the edge of the disc 20. The disc 20 is also provided with a centrally located upwardly extending circular collar 23 within which collar fits a depending circular collar 24 of the azimuth plate 25, the graduated ring 22 constituting the azimuth scale and the plate 25 having a suitable registration mark or indicator 26 to allow an observer to easily and conveniently set the azimuth plate 25 in a selected position relative to the graduations formed upon the upper face of the ring 22—note Figure 2. A suitable spirit level 27 may be supported centrally of the azimuth plate 25 and mounted in counter-sunk position,—as shown in Figure 5.

Figures 2, 7, 12:
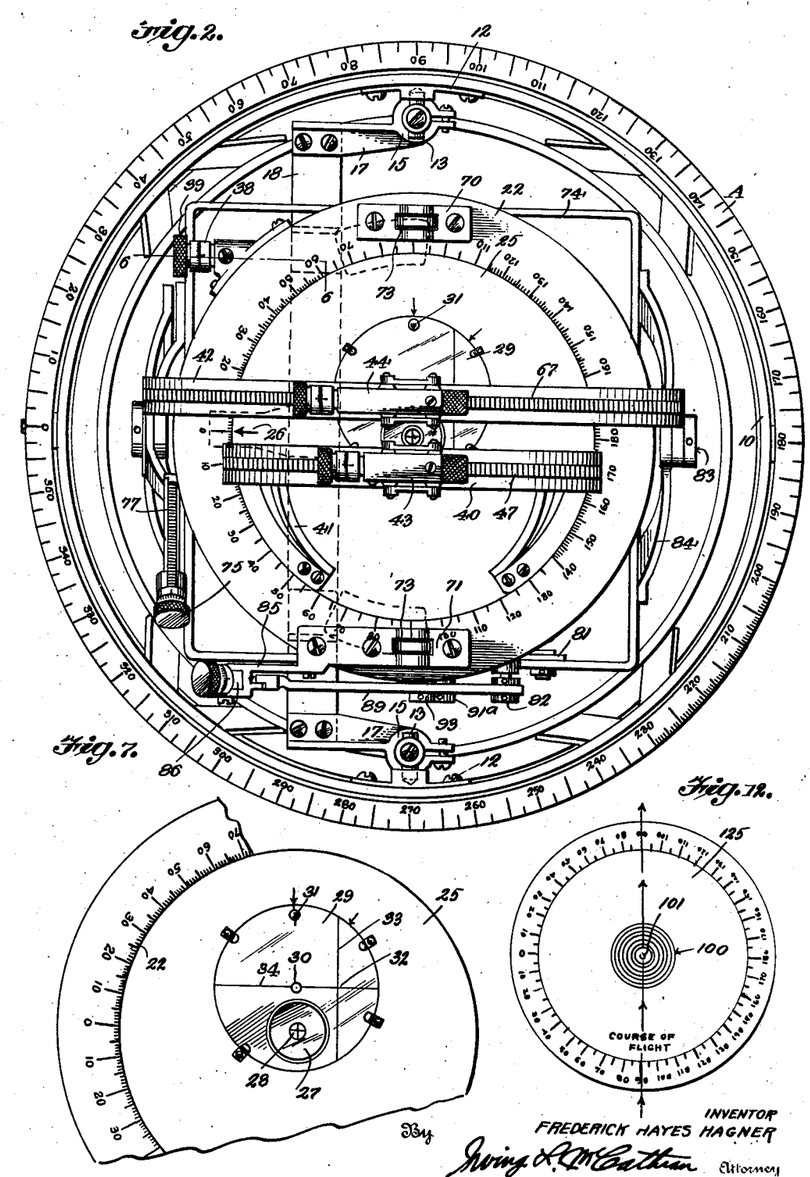
Figure 2 is a top plan view of the complete navigating instrument.
Figure 7 is a fragmentary top plan view of the azimuth ring and azimuth plate showing the mirrored eccentric plate carried thereby.
Figure 12 is a plan view of a modified type of azimuth ring and disc illustrating a chart which is especially designed to ascertain the lateral drift from its set course of a ship upon which the device is mounted.

The transparent cover plate of the spirit level 27 has a mirrored spot 28 in the center thereof, and the spirit level 27 is mounted eccentrically of and is supported by the plate 29. The plate 29 and spirit level 27 extend flush with the top face of the azimuth plate 25, the plate 29 having a mirrored surface. The plate 29 is eccentrically mounted upon the azimuth plate 25 by being pivoted, as at 30, and a suitable operating knob 31 is employed to permit the plate 29 to be shifted to bring either the mirrored spot 28 of the spirit level in the exact center of the plate 25, or to bring the point of junction, as indicated at 32, of the cross lines 33 and 34 to a point constituting the exact center of the plate 25. The mirrored spot 28 of the spirit level 27 is provided with cross lines. Suitable indicating means, such for instance as arrows, may be formed upon the face of the plate 25 to indicate the proper positions of the eccentric plate 29, as shown in Figure 7. The mirrored spot 28 is used when observing the sun because the image of the sun may be easily focused upon the same, and the mirrored plate 29 is used when taking observation by means of reflection of the heavenly bodies at night, such as in the observation of stars, and the like, in order that these heavenly bodies may be more easily reflected upon the larger surface. The spirit level 27, however, is used for the purpose of placing the instrument in a level position. If it is desired, the mirrored plate 29 may be used for observing the sun in the day time, in which event the mirrored surface may be darkened temporarily in order to obtain a proper spot for the sun's rays or a suitable shield may be placed thereover. A suitable lamp bulb or other illuminating device 27a may be placed below the spirit level 27 for the purpose of illuminating the spirit level when used at night, so that the bubble may be seen by the observer as it floats in the spirit level and moves under the mirrored spots 28. The lamp bulb is only of sufficient brilliance to illuminate the bubble and does not project the rays of the bulb above or upon the mirrored surface of the level.

In order that the plate 25 may be properly moved to a desired adjusted position the azimuth plate 25 is provided with a worm gear 35 which meshes with a worm screw 36 carried by a shaft 37, the shaft 37 being rotated in an anchor journal 38. A knob 39 is carried by the outer end of the shaft 37 and the knob 39 is suitably graduated to permit the same to be set properly with respect to the anchor journal 38—note Figure 2.

The azimuth disc or plate 25 carries an altitude arc 40 which extends perpendicularly of the plate 25 and is fixed to move or rotate therewith, the altitude arc 40 being further braced through the medium of the braces 41 which are also secured to the plate 25. The edges of the altitude arc 40 slightly overhang the graduated ring 22, as shown in Figure 2, and the longitudinal axis of the altitude arc 40 is located to one side of the center of the plate 25, the hour angle arc 42 being located slightly on the opposite side of the center of the plate when the altitude arc 40 and the hour angle arc are adjusted in substantially parallel relation, such for instance as in the position shown in Figure 2.

Figure 9:
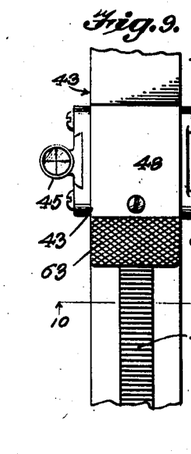
Figure 9 is an enlarged top plan view of one of the adjustable sighting devices.
Figure 10:
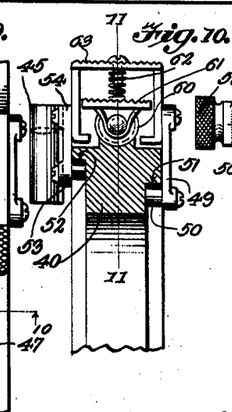
Figure 10 is a transverse sectional view taken on line 10—10 of Figure 9.

An adjustable sighting device 43 is slidably mounted for adjustment upon the altitude arc 40 and an adjustable sighting device 44 is slidably mounted upon the hour angle arc 42. The adjustable sighting device 43 carries a magnifying sight 45 upon its face adjoining the hour angle arc 42, and a magnifying sight 46 is carried by the inner face of the adjustable sighting device 44 adjacent the altitude arc 40. The magnifying sights 45 and 46 are so positioned as to be aligned directly over the center point of the azimuth disc or plate 25. This arrangement will permit the placing of the altitude arc 40 and the hour angle arc 42 upon opposite sides of the center of the azimuth disc or plate 25. The detailed structure of the adjustable sighting device 43 is illustrated in Figures 9, 10 and 11, and the detailed structure of the adjustable sighting device 44 is similar to that illustrated and described with respect to the adjustable sighting device 43.

Figure 11:
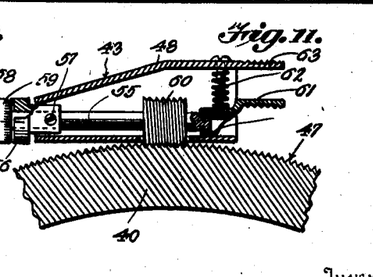
Figure 11 is a vertical section taken on line 11—11 of Figure 10.

As shown in Figure 11, the altitude arc 40 is provided with worm gear teeth 47 upon the periphery thereof and the adjustable sighting device 43 comprises a casing 48 which is anchored upon the altitude arc 40 against displacement through the medium of the links 49 which are secured to the casing 48 upon one side thereof, the lower ends of the links 49 carrying rollers 50 which contact with the flange 51 formed upon one side of the altitude arc 40. The opposite side of the altitude arc 40 is provided with a flange 52 which is contacted by means of rollers 53 carried by the lower end of the plate 54, which plate 54 is secured to the casing 48 upon the side opposite to the links 49, as shown in Figure 10. In this way, the adjustable sighting device 43 will be held against displacement from the altitude arc 40, but at the same time may be free to move along the length of the arc 40. As previously described and as illustrated in detail in Figures 9 and 10, the magnifying sight 45 is secured to the plate 54 in any suitable or desired manner.

The casing 48 carries a longitudinally extending shaft 55 which is rotatably mounted within a journal 56, the journal 56 being pivotally secured or hinged by means of a pin 57 at one end of the casing 48. An operating knob 58 is carried by the shaft 55 and suitable graduations 59 may be formed upon the knob 58 and also register with suitable graduations formed upon the journal 56, as shown in Figure 11, to determine the position of the shaft 55. A worm screw 60 is carried by the shaft 55 and is adapted to mesh with the worm threads 47 formed upon the periphery of the arc 40. A finger hold 61 is loosely journaled upon one end of the sleeve or shaft 55 so as to permit the sleeve 55 to readily rotate and this finger hold 61 is engaged by means of a spring 62 which normally holds the shaft 55 in a position to insure the meshing of the screw 60 with the teeth 47. The casing 48 is provided with an extending finger grip 63 which overhangs the finger hold 61 and by pinching the finger hold 61 toward the finger grip 63, it will be seen that the screw 60 will be lifted out of mesh with the teeth 47 and the adjustable sight device 43 may be rapidly slid to a desired adjusted position upon the arc 40, the shaft 55 through the operating knob 58 being actuated to obtain a more minute adjustment after the screw 60 contacts with the threads 47.

The adjustable sighting device 44 is slidably held in engagement with the hour angle arc 42 through the medium of the links 64 which extend upon one side of the adjustable sighting device 44, and the plate 65 which extends upon the other side. An hour angle arc 42 is substantially T-shaped in cross-section similar to that as illustrated in Figure 10, with respect to the altitude arc 40, and the adjustable sighting device 44 is mounted in a similar manner to the sighting device 43. The outer periphery of the hour angle arc 42 is provided with worm gear threads which are engaged by a worm screw similar to the one illustrated in Figure 11, which worm screw is actuated through the medium of an operating rod 66.

Journals 70 and 71 are carried by the upper face of the graduated azimuth ring 22 and these journals 70 and 71 support journal pins 72 upon which pins 72 are hung the hanger arms 73, it being noted that the central axes of the journal pins 72 are in the same horizontal plane with the upper face of the graduated azimuth ring 22 and the circular azimuth disc or plate 25. The journals 70 and 71 are secured in any suitable or desired manner to the upper face of the ring 22 and are arranged in diametrically opposite positions and are in line with the journal pins 13 which form a part of the gimbals.

The hanger arms 73 may be designed in any shape to properly suspend a supporting band or frame 74 below the ring 22. A micrometer adjusting screw 75 is supported upon the band or frame 74 and may be properly adjusted in the conventional manner, the micrometer screw 75 being adapted to mesh with the worm screw threads 76 formed on the periphery of the graduated hour angle segmental wheel 77. This wheel 77 may be properly graduated in conjunction with an indicator 78 whereby a proper setting of the hour angle segmental wheel 77 may be obtained. The micrometer adjusting screw 75 is pivoted, as at 79, so as to permit the screw 75 to be swung into and out of engagement with the screw thread 76 thereby permitting the segmental wheel 77 to be freely swung when desired, without operating the screw 75. The wheel 77 is supported upon a journal 80 which is carried by the supporting arms 81, which supporting arms are in turn carried by the supporting band or frame 74, the central axis of the journal 80 being in the same plane with the upper face of the plate 25 when the hour angle segmental wheel is in a vertical position. The hour angle arc 42 is secured at one end to the segmental wheel 77, as at 82, and is journaled at its opposite end upon a journal 83—note Figures 3 and 5. The journal 83 is diametrically opposite the journal 80 and the axes of the journals 80 and 83 are at right angles to the axes of the journal pins 13 and the journals 12. It will therefore be seen that the band 74 is suspended by the hangers 73, and the arms 81 and 84, the journal 83 being carried by the upper end of the arm 84.

The journal 71 carries a depending arm 85 upon which is secured a micrometer screw 86, the screw 86 being pivoted at 87 to permit the screw to be thrown into and out of engagement with the worm gear teeth 88 formed on the periphery of the graduated latitude arc or segment 89. The graduated latitude arc or segment 89 is graduated in conjunction with an indicating mark 90 formed on the holder 91 of the micrometer adjusting screw 86 to allow an operator to properly adjust the arc 89. The segment or arc 89 is pivoted, as at 91a upon the disc 20, in any suitable or desired manner, and this segment or arc 89 is connected as at 92 and 93 to the arm 81 and to the band 74 so as to swing the band 74 which elevates the pivots 83 as the micrometer adjusting screw 86 is actuated to swing the latitude segment or arc 89 upwardly. The hanger arms 73 will permit the band 74 to be swung or rocked at right angles to the axis of the hour angle segment thereby permitting the raising of the hour angle segment to obtain a proper indication of the latitude of the observer upon the latitude segment 89. The hour angle arc 77 may be actuated to laterally swing the hour angle arc 42 to the proper position.

Figure 1:
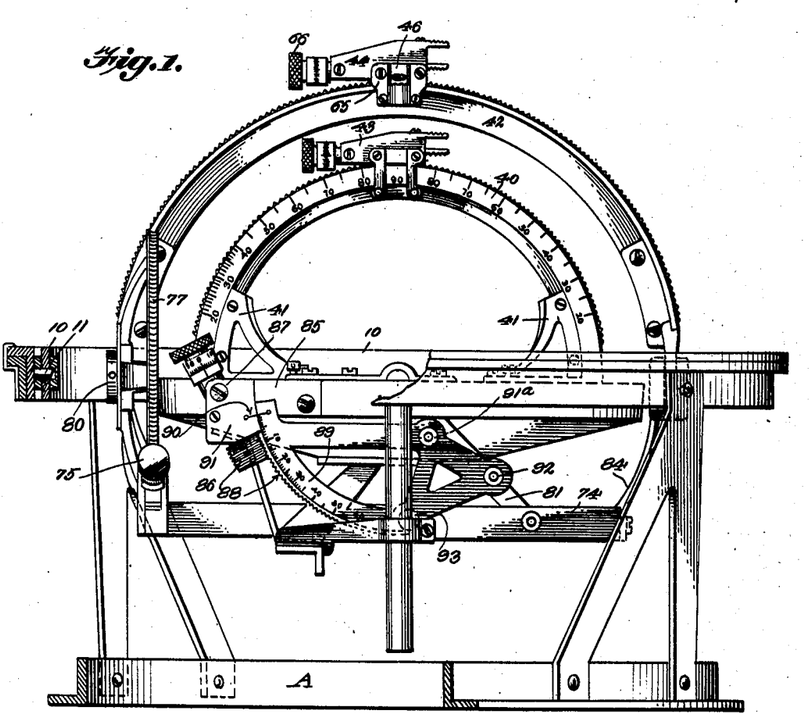
Figure 1 is a side elevation of the navigating instrument partly broken away.

In carrying out the invention it is preferable to graduate the azimuth ring 22 from a point north from 0 to 180 degrees upon either side of the center to a point south. The latitude arc 89 is graduated, as indicated in Figure 1. The altitude arc 40 is graduated as indicated in Figure 1. The hour angle arc 42 is also graduated as indicated in Figure 5.

From the foregoing description, it will be seen that a navigating instrument is mounted for swinging movement upon the gimbals A in the conventional manner to permit the swinging of the navigating instrument in two different selected directions. It will be further noted that the platform 18 is suspended upon the journal pins 13 by means of the hangers 14 and that this platform 18 supports the disc 20 and the azimuth plate 25, as well as the azimuth ring 22. The azimuth plate 25 may be rotated within the ring 22, and at all times remain in the same plane with the ring 22. The ring 22 supports the journals 70 and 71 which journals carry the hanger arms 73 and these hanger arms suspend the frame or band 74, which frame or band 74 in turn supports the hour angle arc 42 through the medium of the arms 81 and 84, and these are entirely independent from the disc 20, and the platform 18, thereby permitting the hour angle arc 42 and the frame 74 to be swung diametrically of the ring 22 and plate 25. It should be noted also that the hour angle arc 42 is pivoted upon the journals 80 and 83 so that this hour angle arc 42 may be swung laterally in addition to the movement of the frame 74 and the hour angle arc diametrically with respect to the ring 22 and the plate 25.

The journal 80 may be provided with a central bore 94 to provide a sight opening to permit the operator to sight the North Star by obtaining a reflection upon the mirror plate 29 and swinging the journal 80 and the associated parts constituting the latitude indicating means upwardly to a proper angle where the North star may be sighted upon the plate 29. When the plate 29 has been moved so that the crossing point 32 of the lines 33 and 34 are in the center of the plate 25, and the reflection of the North Star coincides with this cross mark 32, the instrument being pointed north and south and level and the sight opening 94 is in registration with the cross mark 32, the proper latitude of the observer will be indicated on the latitude segment or arc 89.

In Figure 12, I have shown a modified type of the invention illustrating an azimuth ring 22a within which is rotatably mounted an azimuth disc 25a, upon the center of which may be placed a chart 100 having preferably a series of concentric circles indicated thereon and this chart may be in the nature of a reflecting plate or mirror having the concentric circles appearing thereon. In using this particular device just described, the chart 100 may be placed in the center of the disc 25a, or may be placed upon the center of the disc 25, as shown in Figure 2, so as to place the center of the chart 100 directly in the center of the disc 25. Then by adjusting the latitude mechanism and the hour arc 42 to cause a ray of light to pass down through the adjustable sighting device 44 and spot upon the center 101, the operator may ascertain the approximate amount of lateral drift of the ship upon which the device is mounted by noting the location of the spot of light from the center position to its new location. This device is particularly of value in determining the amount of drift from the course of flight caused by the action of the wind upon the ship carrying the device.

Figure 14:
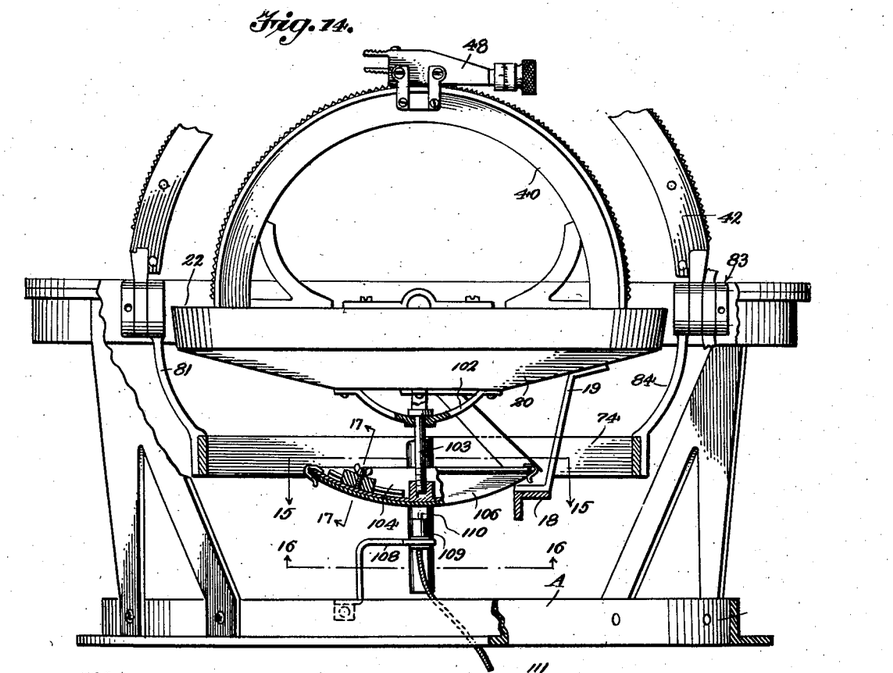
Figure 14 is a side elevation partly in section showing the improved navigating instrument and illustrating in detail the recording device which is especially adapted to record the angle of the ship upon which a device is mounted relative to the navigating instrument at the time of making an observation with the instrument.
Figure 15:
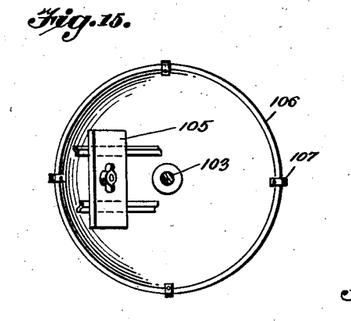
Figure 15 is a section taken on line 15—15 of Figure 14.
Figure 16:
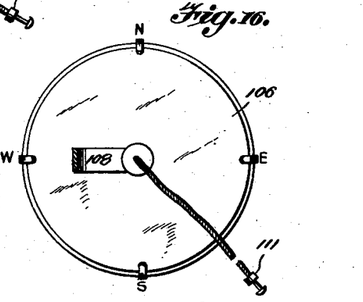
Figure 16 is a section taken on line 16—16 of Figure 14.
Figure 17:
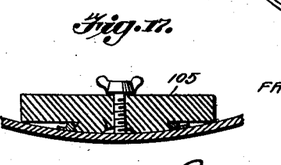
Figure 17 is an enlarged section taken on line 17—17 of Figure 14.

By noting particularly Figure 14 it will be seen that the disc 20 supports a hanger 102 at the center thereof and depending from the exact center of the disc 20 and hanger 102 is a suspending pin 103 mounted to rotate in the hanger 102. A dished plate 104 is secured to the lower end of the pin 103 and the dished plate 104 on the same arc as the altitude arc 40 and is suspended directly below. A counter-balanced weight 105 is mounted within the dished plate 104 in order that the dished plate may be properly balanced it being noted that the pin 103 may be rotated to change the position of the weight 105 from one side to the opposite side of the pin 103, if desired. A recording sheet or chart 106 is fixed to the inner face of the dished plate 104, which plate is concavo-convex in cross-section and clips 107 are carried by the plate 104 for securing the sheet 106 in position. A bracket 108 is supported upon the base of the frame gimbal A, and this bracket carries a punching or perforating device 109 of any suitable structure having a punch pin 110 which is adapted to punch against the sheet 106 and make an indentation therein thereby recording the position of the base of the gimbal frame A with respect to the angular position of the azimuth ring 22 and disc 25. The punch pin 110 may be operated in any suitable manner, such for instance as by means of an operating button 111. Through the medium of this device, should the ship upon which the mechanism is mounted be at an angle when the observation is taken, and the navigating instrument is on level, the difference between these angles will be recorded upon the sheet 106.

The difference between the center of the chart and the location of the punch therein indicates the degree at which the ship is off level and indicates the error in degrees between the instrument and the observed body. In checking his position, the observer will then know that while the observation was being taken the ship was not level with the instrument and further observations might be made if desired with the ship as well as the instrument both level to obtain a more accurate reading.

The present instrument accomplishes two purposes. It incorporates the function of the sextant, in that it measures the altitude of the celestial body above the horizon (artificial horizon). It also mechanically solves the astronomical triangle. This mechanical solution obviates the laborious calculation involved in the various trigometrical and tabular solutions now in vogue, thereby being of great advantage to the navigator.

The only astronomical data required, with the use of this instrument, are the American Nautical Almanac, azimuth tables, parallax and refraction table and the Greenwich civil time. As a matter of fact, the azimuth tables are not necessary to obtain your line of position as is shown under two methods of operation.

American Nautical Almanac furnishes the declination and Greenwich hour angle of the observed body.

The azimuth tables, Hydrographic Office Publications Nos. 71 and 120 furnish the azimuth of the observed body.

The refraction and parallax table is used to reduce the observed altitude to the true altitude of the observed body. Find table below.

The Greenwich civil time is used as one argument in entering table in Nautical Almanac to obtain the necessary data (Declination and Greenwich hour angle).

*Practical table parallax and refraction for sun and stars*

| Observed altitude | True altitude |
|---|---|
| 5 | 4 50' |
| 6 | 5 52' |
| 7 | 6 53' |
| 8 | 7 53' |
| 9 | 8 54' |
| 10 | 9 55' |
| 12 | 11 56' |
| 16 | 15 57' |
| 21 | 20 58' |
| 33 | 32 59' |
| Above 70 | No correction |

In order that the operation of the device may be clearly understood, a statement of the operation is as follows:—

1. Have watch set for G. C. T.
2. Set declination tube 46 for proper declination of body to be observed according to G. C. T. in nautical almanac.
3. Set latitude arc 89 to exact latitude of place.
4. Head plane upon which the instrument is mounted on magnetic course to be traveled (according to plane's compass).
5. Turn instrument in gimbal ring and turn hour angle arc adjusting screw 75 until the observed body's light for instance, the sun is centered over cross mark on top of bubble (instrument to be level). Then read the azimuth on the azimuth scale 22 on the instrument and determine the deviation of the compass. The instrument has to point true north when set as stated above, so the difference is the compass error, which includes both variation and deviation.
6. You are now ready to take off so far as navigation is concerned. As soon as you have gained altitude enough make another observation with aircraft's head on true course by compass, your sun spot should then be exactly on cross mark (instrument to be on level by use of gyroscope).
7. By dividing the G. H. A. (given in nautical almanac) into ten minute intervals you are prepared to make observations at these exact times and check your position accordingly. If you get an instrument reading that does not check with your computed position as derived from your track angle, ground speed, and elapsed time it shows that you have ecountered a wind causing the change. You then may correct your reading by applying the drift as determined by the difference between your computed and actual positions.
8. The exact latitude is read from the instrument. You add the hour angle reading on instrument to G. H. A. if the body is east of the meridian and subtract if west of the meridian. The answer will be your longitude in degrees and minutes.

Observation chart

| Nautical Almanac data | | | Instrument readings | | | |
|---|---|---|---|---|---|---|
| Local time A. M. | Greenwich time | Observed body dec. | G. H. A. | L. H. A. | Longitude | Latitude |
| 11.10 | 17.10 | 23°18′ | 83°35′ | +14°35′ | =98°10′ | 28°37′ |
| 11.20 | 17.20 | 23°18′ | 84°— | +14°10′ | =98°10′ | 28°47′ |
| 11.30 | 17.30 | 23°18′ | 84°25′ | +13°45′ | =98°10′ | 28°57′ |
| 11.40 | 17.40 | 23°18′ | 84°50′ | +13°22′ | =98°12′ | 29°07′ |

Course steered (compass 9° east) true course north. Wind direction, south. Velocity, 3 miles per hour.

How to use the instrument

One method of using instrument for the sun is as follows:
1. Set the declination of the sun on the declination scale of instrument.
2. Set D. R. latitude on L scale of instrument.
3. Measure the altitude of the sun, by manipulation of instrument and altitude slide in such a manner that the sun's rays, passing through the aperture of altitude slide, cause the sun's image or cross hair shadow to fall upon the center of small mirror located on center of bubble chamber. Instrument must be held level during this operation, and is so indicated by the centering of the bubble beneath the small mirror upon which the sun's image or cross hair shadow falls. Reduce the observed altitude to the true altitude and reset altitude slide to this true altitude. The navigator who so desires, may use the sextant instead of this instrument, to measure the altitude of sun; then, after reducing same to the true altitude, it is set on the altitude scale of this instrument. Note the G. C. T. of observation.
4. Bring the center of altitude slide aperture and center of the declination slide aperture into coincidence by moving only the altitude semicircle in azimuth and swinging the hour semicircle to the right or left.
5. Read local hour angle from hour angle scale and azimuth of the sun from azimuth scale. If the body is rising or east of the meridian azimuth is measured, on the instrument, east of the instrument's meridian; if the body is setting or west of the meridian azimuth is measured west of the instrument's meridian. In other words, if instrument is approximately oriented i. e. the elevated pole of instrument pointing to the approximate astronomical north, it will at once be apparent which way the azimuth should be measured.
6. Combine the G. H. A. with the L. H. A.; the result is the longitude in arc. Plot line of position on chart, using the D. R. latitude; longitude, obtained from L. H. A. read from instrument; and azimuth read from instrument.

The above method will be recognized as a mechanical solution of the tangent summer method of solving the astronomical triangle. The trigonometrical solution, involves the use of the formulae: hav $t = \sec L \csc p \cos s \sin (3-h)$ solving for L. H. A. and hav $180-Z = \sec h \sec L \cos s \cos (s-p)$ solving for azimuth.

Note: This method is not recommended when the observed body is within two hours of the meridian, due to the triangle being very flat so that a small error in the D. R. latitude position will cause a corresponding large error in the L. H. A.

Second method

The following is a method that can universally be used. It is immaterial if the body is close to the prime vertical or the meridian. This method is a mechanical solution of the Saint Hilaire method known as the calculated altitude, the most popular formulae being: hav $Z = \cos L \cos d$ hav $t + \text{hav} (1d)$, solving for the calculated altitude and $\sin Z = \sin t \cos d \sec h$, solving for azimuth.

The method of solving this on the instrument is as follows:

First, observe and record the altitude of sun and note the time of observation (G. C. T.), reduce to true altitude, then:
1. Set declination on dec. scale.
2. Assume a latitude and longitude, set latitude on L scale of instrument, convert assumed longitude, into L. H. A. and set on instrument.
3. Bring center of aperture of altitude slide and declination slide into coincidence by moving only altitude semicircle in azimuth and altitude slide along altitude scale.
4. Read altitude and azimuth, this altitude is known as the calculated altitude and, if the assumed position were correct and the observation made at the time corresponding to the hour angle, would be the actual corrected observed altitude.
5. Find the difference between the true observed altitude and the calculated altitude. This difference in minutes of arc is known as the intercept.
6. Plot as follows: Mark the assumed position on chart and draw a dotted line through this position at right angles to the azimuth of observed body. On the azimuth line lay off the intercept, if the observed altitude is greater than the calculated altitude lay off intercept, toward the observed body and if observed alt. is less than the calculated altitude lay off intercept away from the observed body, and through this new position draw a line parallel to dotted line. This last line drawn is your line of position and you are located somewhere on this line.

Third method

This method involves the orientation of instrument with reference to true north and is the method for which instrument was primarily designed.

Operation is as follows:—
1. Set declination of sun on declination scale of instrument.
2. Observe altitude of sun noting the time (G. C. T.) and reduce to true altitude and reset altitude slide to true altitude.
3. Obtain azimuth of the sun from azimuth tables and set this on instrument by moving the altitude semicircle to the correct indication on horizon ring.
4. Bring the center of altitude slide aperture and center of the declination slide aperture into coincidence by moving the hour semicircle and the latitude scale setting only.
5. Read latitude and hour angle from the instrument.
6. Combine the G. H. A. and the L. H. A. as read from the instrument, the result is the longitude in arc.
7. Plot position and draw line through this position at right angle to azimuth obtained from tables and set on instrument. This line is your line of position.

The greater the accuracy of the azimuth, the closer you will be to the position as read from the instrument. In other words if the azimuth is set accurately, it is possible to obtain a fix with the instrument. However, it is never possible to set the azimuth accurately unless you know your exact position; therefore, you should consider your position as somewhere on the line instead of a fix. Bearing in mind, however, that your actual position on the line is closer to the fix, as read from the instrument, the greater the accuracy of azimuth setting.

Note: Azimuth may be measured directly by orienting instrument by compass but this method is not considered as accurate as the azimuth obtained from the tables. Any method used in navigation involves the solution or part solution of the astronomical triangle; therefore, this instrument may be used universally. The accuracy of the solution depends upon the precision of manufacture of the instrument.

It should be understood that certain detail changes in the mechanical construction, combination and arrangement of parts may be employed without departing from the spirit of the invention, so long as such changes fall within the scope of the appended claims.

Having described the invention, what is claimed as new is:—

1. In a position finder, an azimuth circle, reflecting means located at the center of said azimuth circle upon which a ray of light from a selected celestial body may be cast, an altitude arc adjustable circumferentially of said azimuth circle, an altitude indicator adjustable upon said altitude arc, a latitude indicating means carried by said azimuth circle, a pivoted hour arc movable upon said latitude indicating means in a direction diametrically of said azimuth circle, an indicator slidable upon said hour arc, and means for indicating the hour angle position of the hour angle arc when said altitude indicator and said indicator carried by said hour arc are in registration.

2. In a position finder, an azimuth circle, a mirror located at the center of said azimuth circle upon which a ray of light from a selected celestial body may be cast, an altitude arc adjustable circumferentially of said azimuth circle, an altitude indicator adjustable upon said altitude arc, a latitude indicating means carried by said azimuth circle, a pivoted hour arc movable upon said latitude indicating means in a direction diametrically of said azimuth circle, an indicator slidable upon said hour arc, and means for indicating the hour angle position of the hour angle arc when said altitude indicator and said indicator carried by said hour arc are in registration.

3. An astronomical instrument for locating the position of an observer relative to a selected celestial body comprising means upon which a beam of light is cast from a selected celestial body, leveling means mounted upon said first mentioned means and at a point to receive the light of the beam from the celestial body, indicating means for pointing the last mentioned means due north and south, means for measuring the angle of the beam as it is cast upon said first mentioned means, and said first mentioned means constituting a reflecting medium for facilitating the observation of a celestial body at night.

4. An astronomical instrument of the class described comprising an azimuth table arranged to extend in a horizontal position, leveling means therefor, reflecting means associated adjacent the leveling means to facilitate the observation of a celestial body at night and at the same time facilitate the leveling of the instrument, means for supporting said reflecting means for rotating movement in a horizontal plane for adjusting the azimuth reading, an altitude arc supported by said last mentioned means and carrying an adjustable sighting index, a latitude indicating means mounted for swinging movement in a vertical plane, an hour angle arc pivotally secured to said latitude indicating means at its axis, and a sight index adjustably mounted upon said hour angle arc.

5. An astronomical instrument comprising an azimuth ring adapted to extend in a horizontal position, a disc rotatably mounted upon said ring and extending flush with the upper face thereof and normally extending in a horizontal plane, a level mounted in the center of said disc, a central mirrored spot placed directly over the center of the disc and having a cross mark thereon adapted to extent north and south, east and west, a concentrically spaced mirrored surface arranged around said mirror spot providing a clear intermediate surface to permit the observation of the level, an altitude arc carried by said disc and having a sight index adjustably mounted thereon, a latitude indicating means mounted for circumferential movement around said azimuth ring in a vertical plane across the axis of the azimuth ring, an hour angle arc pivotally secured to said latitude indicating means at its axis and capable of being swung laterally with respect to the vertical axis of the latitude indicating means, and a slidable sight index carried by said hour angle arc.

6. An astronomical instrument comprising an azimuth ring adapted to extend in a horizontal position, a disc rotatably mounted upon said ring and extending flush with the upper face thereof and normally extending in a horizontal plane, a level mounted in the center of said disc, a central mirrored spot placed directly over the center of the disc and having a cross mark thereon adapted to extent north and south, east and west, a concentrically spaced mirrored surface arranged around said mirrored spot providing a clear intermediate surface to permit the observation of the level, an altitude arc carried by said disc and having a sight index adjustably mounted thereon, a latitude indicating means mounted for circumferential movement around said azimuth ring in a vertical plane across the axis of the azimuth ring, an hour angle arc pivotally secured to said latitude arc at its axis and capable of being swung laterally with respect to the vertical axis of the latitude indicating means, a slidable sight index carried by said hour angle arc, said azimuth ring being graduated from a point north from 0 to 180 degrees upon either side of its center to a point south, the latitude arc being graduated from a point constituting its axis and pointing north from 0 to 90 degrees, said altitude arc being graduated from a point constituting its center toward each end from 0 to 90 degrees, and the hour angle arc being similarly graduated.

7. An instrument of the class described comprising an azimuth ring suitably graduated, a disc rotatably mounted upon the azimuth ring and extending flush with the upper face thereof and arranged in a horizontal plane, a spirit level centrally located upon said disc, reflecting means located centrally of the disc, a second reflecting ring arranged about said first mentioned reflecting means for providing a clear space for permitting the viewing of said spirit level, and means associated with the azimuth ring locating the position of an observer with respect to a celestial body by means of reflection upon said reflecting surface.

8. In a position finder for locating the amount of drift from a set course of flight comprising a means upon which a ray of light from a selected celestial body may be cast, a latitude indicating mechanism adjustable diametrically of said means, an hour angle arc adjustable for lateral swinging movement upon the latitude indicating mechanism, an adjustable sighting device carried by said hour angle arc, and a chart carried by said first mentioned means to indicate the shift of position from the mentioned ray of light whereby the drift of the ship upon which the device is mounted may be approximately ascertained.

9. In a position finder, an azimuth scale, reflecting means located at the center of said azimuth scale upon which a ray of light from a selected celestial body may be cast, an altitude measuring means adjustable circumferentially of said azimuth scale, a latitude indicating means mounted adjacent the azimuth scale, and an hour angle measuring means adjustable laterally with respect to said latitute indicating means and also adjustable diametrically of the azimuth scale.

10. In a position finder, an azimuth scale, reflecting means located at the center of said azimuth scale upon which a ray of light from a selected celestial body may be cast, an altitude measuring means adjustable circumferentially of said azimuth scale, a latitude indicating means mounted adjacent the azimuth scale, an hour angle measuring means adjustable laterally with respect to said latitude indicating means and also adjustable diametrically of the azimuth scale, and means for indicating the hour angle position of the hour angle measuring means.

11. In a position finder, an azimuth scale, reflecting means located at the center of said azimuth scale upon which a ray of light from a selected celestial body may be cast, an altitude measuring means adjustable circumferentially of said azimuth scale, a latitude indicating means mounted adjacent the azimuth scale, an hour angle measuring means adjustable laterally with respect to said latitude indicating means and also adjustable diametrically of the azimuth scale, means for indicating the hour angle position of the hour angle measuring means, a leveling means carried adjacent the azimuth scale, and illuminating means for said leveling means.

12. In combination with supporting gimbals, an azimuth scale suspended upon said gimbals, an azimuth disc adjustable circumferentially within said azimuth scale, latitude indicating means suspended below said azimuth scale and mounted for swinging movement with respect to said scale, means for swinging said latitude indicating means, an hour angle indicating means mounted for lateral swinging movement with respect to said azimuth scale, and means for swinging said hour angle indicating means.

13. In combination with supporting gimbals, hangers mounted for swinging movement thereon, a platform fixed to said hangers, a plate supported above said platform, an azimuth ring carried by said plate, an azimuth disc mounted for rotation circumferentially within said azimuth ring, an altitude arc carried by said azimuth disc, hanger arms journaled upon said azimuth ring and suspended below the same, a frame carried by the lower end of said last mentioned hanger arms, a graduated segmental arc having worm teeth carried by said plate, a micrometer screw engaging said segmental arc for adjusting the position of said frame with respect to said azimuth ring, and an hour angle arc mounted for lateral swinging movement above said azimuth ring.

14. In combination with supporting gimbals, hangers mounted for swinging movement thereon, a platform fixed to said hangers, a plate supported above said platform, an azimuth ring carried by said plate, an azimuth disc mounted for rotation circumferentially within said azimuth ring, an altitude arc carried by said azimuth disc, hanger arms journaled upon said azimuth ring and suspended below the same, a frame carried by the lower end of said last mentioned hanger arms, a graduated segmental arc having worm teeth carried by said plate, a micrometer screw engaging said segmental arc for adjusting the position of said frame with respect to said azimuth ring, an hour angle arc mounted for lateral swinging movement above said azimuth ring, said hour angle arc being journaled at a point constituting the diametric center of said azimuth disc, a sight opening at the center of said journal means upon which a ray of light may be cast located at the center of said disc, a graduated segmental gear wheel supporting said hour angle arc, a micrometer adjusting screw engaging said last mentioned graduated segmental gear wheel for swinging said hour angle indicating arc, and a micrometer adjusting screw engaging said azimuth disc for adjusting said azimuth disc.

15. A device of the class described comprising an azimuth ring, an azimuth disc mounted for adjustment upon said ring, a latitude indicating means associated with said ring and adjustable with respect thereto, an altitude arc carried by said azimuth disc, an hour angle arc hinged for lateral swinging movement upon said latitude indicating means, said altitude arc and hour angle arc being substantially T-shaped in cross-section, slidably mounted sighting devices carried by said arcs, a magnifying telescope carried by each sighting device and positioned for alignment with the direct center of said azimuth disc, each of said arcs having teeth formed thereon, and micrometer adjusting screws mounted for releasable engagement with the teeth of said arcs whereby the position of said sighting devices may be minutely adjusted.

16. A device of the class described comprising an azimuth ring, an azimuth disc mounted for adjustment upon said ring, a latitude indicating means associated with said ring and adjustable with respect thereto, an altitude arc carried by said azimuth disc, an hour angle arc hinged for lateral swinging movement upon said latitude indicating means, said altitude arc and hour angle arc being substantially T-shaped in cross-section, slidably mounted sighting devices carried by said arcs, a magnifying telescope carried by each sighting device and positioned for alignment with the direct center of said azimuth disc, each of said arcs having teeth formed thereon, micrometer adjusting screws mounted for releasable engagement with the teeth of said arcs whereby the position of said sighting devices may be minutely adjusted, the teeth on said arcs being formed upon their outer faces, and the releasable teeth engaging means comprising a worm screw and a finger engaging arm for facilitating the lifting of said worm screw out of engagement with said teeth.

17. In a position finder, an azimuth scale, reflecting means associated with said scale upon which a ray of light from a selected celestial body may be cast, said reflecting means being in substantially the same plane as the azimuth scale, and means for measuring the angle of the reflected ray of light cast upon said reflecting means in and for the purpose specified.

FREDERICK HAYES HAGNER.